(12) United States Patent
Bathiche et al.

(10) Patent No.: US 8,687,021 B2
(45) Date of Patent: *Apr. 1, 2014

(54) AUGMENTED REALITY AND FILTERING

(75) Inventors: Steven N. Bathiche, Kirkland, WA (US); Jon Marcus Randall Whitten, Sammamish, WA (US); John Mark Miller, Kirkland, WA (US); Matthew B. MacLaurin, Woodinville, WA (US); Boyd Cannon Multerer, Seattle, WA (US); James M. Alkove, Woodinville, WA (US); Zachary Lewis Russell, Redmond, WA (US); Eric P. Wilfrid, Mountain View, CA (US); Bret P. O'Rourke, Kirkland, WA (US); Oliver R. Roup, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/588,147

(22) Filed: Aug. 17, 2012

(65) Prior Publication Data

US 2012/0306920 A1     Dec. 6, 2012

Related U.S. Application Data

(63) Continuation of application No. 11/966,926, filed on Dec. 28, 2007, now Pat. No. 8,264,505.

(51) Int. Cl.
*G09G 5/00* (2006.01)

(52) U.S. Cl.
USPC .......................................... 345/633; 345/629

(58) Field of Classification Search
USPC .................................................. 345/629, 633
See application file for complete search history.

(56) References Cited

U.S. PATENT DOCUMENTS

| | | |
|---|---|---|
| 5,320,538 A | 6/1994 | Baum |
| 5,423,554 A | 6/1995 | Davis |
| 5,432,895 A | 7/1995 | Myers |
| 5,490,784 A | 2/1996 | Carmein |
| 5,577,981 A | 11/1996 | Jarvik |
| 5,625,765 A | 4/1997 | Ellenby et al. |
| 5,702,323 A | 12/1997 | Poulton |
| 5,751,289 A | 5/1998 | Myers |
| 5,850,352 A * | 12/1998 | Moezzi et al. ................ 345/419 |
| 5,883,628 A | 3/1999 | Mullaly et al. |
| 5,913,727 A | 6/1999 | Ahdoot |
| 6,037,914 A | 3/2000 | Robinson |
| 6,064,749 A | 5/2000 | Hirota et al. |

(Continued)

OTHER PUBLICATIONS

Office action for U.S. Appl. No. 11/764,120, mailed on Aug. 30, 2012, Kansal et al., "Virtual Reality Enhancement Using Real World Data", 16 pages.

(Continued)

*Primary Examiner* — M Good Johnson
(74) *Attorney, Agent, or Firm* — Holly Nguyen; Carole Boelitz; Micky Minhas

(57) ABSTRACT

A system (and corresponding method) that can enhance a user experience by augmenting real-world experiences with virtual world data to is provided. The augmented reality system discloses various techniques to personalize real-world experiences by overlaying or interspersing virtual capabilities (and data) with real world situations. The innovation can also filter, rank, modify or ignore virtual-world information based upon a particular real-world class, user identity or context.

20 Claims, 11 Drawing Sheets

(56) References Cited

U.S. PATENT DOCUMENTS

| | | | |
|---|---|---|---|
| 6,066,075 | A | 5/2000 | Poulton |
| 6,084,979 | A | 7/2000 | Kanade et al. |
| 6,094,677 | A | 7/2000 | Capek et al. |
| 6,102,832 | A | 8/2000 | Tani |
| 6,122,627 | A | 9/2000 | Carey et al. |
| 6,134,540 | A | 10/2000 | Carey et al. |
| 6,141,034 | A | 10/2000 | McCutchen |
| 6,166,744 | A | 12/2000 | Jaszlics et al. |
| 6,181,302 | B1 | 1/2001 | Lynde |
| 6,199,008 | B1 | 3/2001 | Aratow et al. |
| 6,226,237 | B1 | 5/2001 | Chan et al. |
| 6,408,257 | B1 | 6/2002 | Harrington et al. |
| 6,477,527 | B2 | 11/2002 | Carey et al. |
| 6,507,353 | B1 | 1/2003 | Huard et al. |
| 6,570,581 | B1 | 5/2003 | Smith |
| 6,672,961 | B1 | 1/2004 | Uzun |
| 6,945,869 | B2 | 9/2005 | Kim et al. |
| 6,951,515 | B2 | 10/2005 | Ohshima et al. |
| 6,999,083 | B2 | 2/2006 | Wong et al. |
| 7,001,272 | B2 | 2/2006 | Yamashita et al. |
| 7,050,078 | B2 | 5/2006 | Dempski |
| 7,099,745 | B2 | 8/2006 | Ebert |
| 7,138,963 | B2 | 11/2006 | Hobgood et al. |
| 7,162,054 | B2 | 1/2007 | Meisner et al. |
| 7,398,093 | B2 | 7/2008 | Hull et al. |
| 7,446,772 | B2 | 11/2008 | Wong et al. |
| 7,707,163 | B2 | 4/2010 | Anzalone et al. |
| 8,264,505 | B2 * | 9/2012 | Bathiche et al. ............... 345/633 |
| 2002/0010734 | A1 | 1/2002 | Ebersole et al. |
| 2002/0167536 | A1 | 11/2002 | Valdes et al. |
| 2003/0177218 | A1 | 9/2003 | Poirot et al. |
| 2003/0179218 | A1 | 9/2003 | Martins et al. |
| 2004/0193441 | A1 | 9/2004 | Altieri |
| 2005/0066291 | A1 | 3/2005 | Lewak |
| 2005/0280661 | A1 | 12/2005 | Kobayashi et al. |
| 2006/0038833 | A1 | 2/2006 | Mallinson et al. |
| 2006/0047704 | A1 | 3/2006 | Gopalakrishnan |
| 2006/0105838 | A1 | 5/2006 | Mullen |
| 2006/0262140 | A1 | 11/2006 | Kujawa et al. |
| 2007/0035561 | A1 | 2/2007 | Bachelder et al. |
| 2007/0035562 | A1 | 2/2007 | Azuma et al. |
| 2007/0038944 | A1 | 2/2007 | Carignano et al. |
| 2007/0110298 | A1 | 5/2007 | Graepel et al. |
| 2007/0132785 | A1 | 6/2007 | Ebersole, Jr. et al. |
| 2007/0143119 | A1 | 6/2007 | Jung et al. |
| 2008/0018668 | A1 | 1/2008 | Yamauchi |
| 2008/0060034 | A1 | 3/2008 | Egnal et al. |
| 2008/0150963 | A1 | 6/2008 | Stambaugh |
| 2009/0167787 | A1 | 7/2009 | Bathiche et al. |

OTHER PUBLICATIONS

Office action for U.S. Appl. No. 11/764,120, mailed on Nov. 20, 2012, Kansal et al., "Virtual Reality Enhancement Using Real World Data", 22 pages.

Akesson et al., "Augmented Virtuality: A Method to Automatically Augment Virtual Worlds with Video Images", Abstract, Preface and Table of Contents for Master Thesis at Swedish Institute of Computer Science, Nov. 1997, full text found at http://www.sics.se/kalle/projects/Master_Thesis/Index.html., 5 pgs.

Billinghurst et al., "Collaborative Mixed Reality", In Proceedings of the 1st Intl Symposium on Mixed Reality, ISMR 99, Japan, Mar. 1999, 16 pgs.

McElligott et al., "ForSe FIElds—Force Sensors for Interactive Environments", Lecture Notes in Computer Science, UbiComp 2002: Ubiquitous Computing, 4th Intl Conf, Sweden Sep. 2002, vol. 2498, 8 pgs.

Muir, "Virtual Reality vs Composite Reality" Blog, retrieved on Jun. 6, 2007, at http://citrite.org/blogs/jeffreymuir/2007/02/22/virtual-reality-vs-composite-reality, Feb. 22, 2007, 3 pages.

Piekarski et al., "ARQuake: The Outdoor Augmented Reality Game System", Communications of the ACM, vol. 45, No. 1, Jan. 2002, pp. 36-38.

Rose et al., "Annotating Real-World Objects Using Augmented Reality", Computer Graphics: Developments in Virtual Environments, Proc. CG Intl 95 Conf, Jun. 1995, 21 pgs.

Simsarian et al., "Windows on the World: An Example of Augmented Virtuality", retrieved on Jun. 6, 2007 and found at http://www.sics.se/kalle/published/wow.pdf, 7 pages.

Teitel, "The Eyephone: A Head Mounted Stereo Display", Abstract, Proceedings of SPIE, Sep. 1990, Stereoscopic Displays and Applications, vol. 1256, 2 pgs.

Wikipedia, "Augmented Virtuality", retrieved on Jun. 6, 2007, at http://en.wikipedia.org/wiki/Augmented_virtuality, 1 pg.

Wikipedia, "EyeToy", retrieved on Jun. 6, 2007, found at http://en.wikipedia.org/wiki/EyeToy, 5 pages.

Fischer, et al., "Stylized Augmented Reality for Improved Immersion". <<http://www.gris.uni-tuebingen.de/people/staff/bartz/Publications/paper/vr2005.pdf>> Last accessed on Aug. 17, 2007, Proc 2005 IEEE Conf on Virtual Reality, Mar. 2005, 8 pgs.

Office action for U.S. Appl. No. 11/764,120 mailed on Jun. 7, 2011, Kansal, "Virtual Reality Enhancement Using Real World Data," 13 pages.

Julier, et al., "Information Filtering for Mobile Augmented Reality". Jul. 2, 2002. <<http://www.ait.nrl.navy.mil/3dvmel/papers/j_IEEECGA02.pdf>>, 6 pgs.

Office Action for U.S. Appl. 11/764,120, mailed on Apr. 15, 2011, Aman Kansal, "Virtual Reality Enhancement Using Real World Data", 15 pgs.

Office Action for U.S. Appl. No. 11/764,120, mailed on Feb. 3, 2012, Aman Kansal, "Virtual Reality Enhancement Using Real World Data", 12 pgs.

Non-Final Office Action for U.S. Appl. No. 11/764,120, mailed on Sep. 27, 2011, Aman Kansai, "Virtual Reality Enhancement Using Real World Data ", 12 pages.

Sestito, et al., "Intelligent Filtering for Augmented Reality". <<www.siaa.asn.,au/get/2395365383.pdf>> Last accessed on Aug. 17, 2007, Proc SimTecT, Feb. 2000, 9 pgs.

* cited by examiner

AUGMENTED REALITY AND FILTERING

CROSS REFERENCE TO RELATED PATENT APPLICATIONS

This application is a continuation application which claims priority to commonly assigned U.S. patent application Ser. No. 11/966,926, filed on Dec. 28, 2007 now U.S. Pat. No. 8,264,505, which is incorporated herein by reference.

BACKGROUND

'Augmented Reality' (AR) most often relates to a field of computer research that describes the combination of real world and computer generated data. Conventionally, AR employs the use of video imagery which is digitally processed and 'augmented' with the addition of computer-generated graphics. Traditional uses of AR have been focused around the gaming industry.

Most often, conventional AR systems employed specially-designed translucent goggles. These goggles enabled a user to see the real world as well as computer-generated images projected atop of the real world vision. These systems attempted to combine real-world vision with a virtual world. As well, these systems attempted to interact in real-time via a three dimensional rendering. Unfortunately, traditional systems fall short in their ability to leverage the vast amount of information now available to users.

Other common uses of AR can be seen through today's professional sports. For example, virtual advertisements projected upon a playing field or court can be accomplished by combining the real and virtual worlds. For instance, projection of the first down or line of scrimmage markers upon a football field is but another example of combining real world with computer-generated graphics. Yet another example can be seen in a hockey game where a trail or 'tail' is projected upon a hockey puck. This trail can show both location as well as direction of a hockey puck. While these sports-related examples are not traditional interactive AR, they describe a limited ability to combine the real and virtual-computing worlds to enhance a user experience.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises a system that can address situations where a user encounters nuances of the environment. As such, oftentimes, the visual experience can be enhanced by a making virtual-world data available in the real-world. In one example, benefits of augmented reality (AR) can be observed in the real world when tourists go on vacation. The innovation, in aspects thereof, discloses various techniques to automatically and dynamically overlay or intersperse virtual capabilities (e.g., data) with real world situations. In the tour guide example, a map can guide a user on a particular path based upon preferences where the path is mapped onto an existing visual image observed by the user.

Further, the innovation can provide personalization in that it can filter, rank, modify or ignore based upon a particular class, user identity or context. Thus, instead of bringing additional resources as an augmentation, filtering can work in reverse where distractions are minimized based on preferences or detected contexts. In particular, a user may set a filter such that data pushed from a particular store or context is to be ignored. Similarly, if a detected context has changed, data can be augmented in accordance with a particular device or medium to automatically enrich the given context.

In yet another aspect thereof, machine learning and reasoning mechanisms are provided that employ a probabilistic and/or statistical-based analysis to prognose or infer an action that a user desires to be automatically performed.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
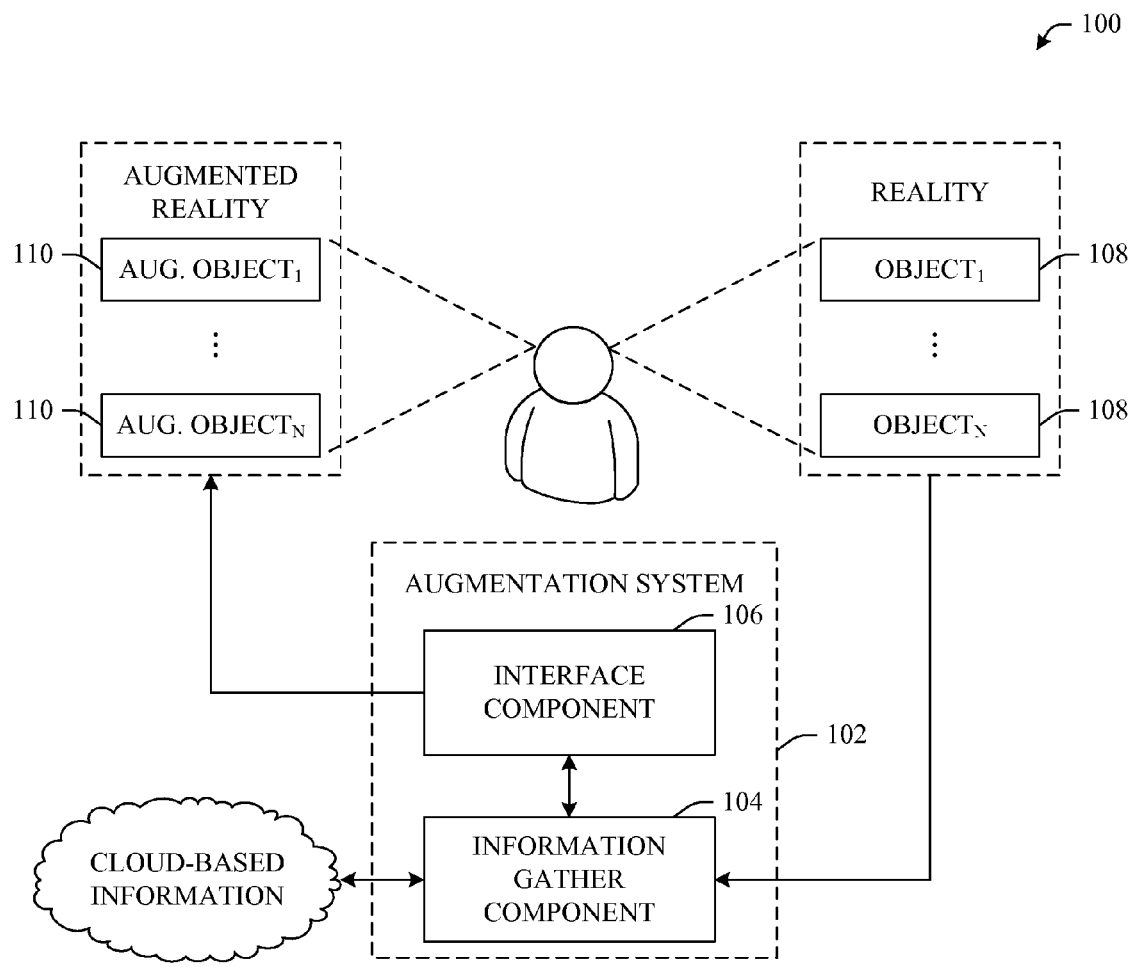
FIG. 1 illustrates an example system that establishes augmented reality by combining real-world with virtual-world data.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring initially to the drawings, FIG. 1 illustrates a system 100 that enables augmenting reality with information and data from virtual sources (e.g., Internet, intranet, cloud-based sources, local stores . . . ). Essentially, the system 100 can monitor reality-based actions and objects, compile information related to the reality-based actions and objects and augment (or overlay) virtual data upon the reality data. This augmented reality rendition can be displayed to a user based upon most any criteria.

By way of example, the augmented reality system 100 can render the consolidated information to a user based upon a personalized preference. In other aspects, the rendering can be based upon a predefined policy (e.g., personal, enterprise-based). Still further, contextual factors can be employed to configure rendered data. Here, the context factors can include most any factors such as, but not limited to, activity context, user context, environment context, etc. These contextual factors will be described in greater detail with reference to FIG. 5 that follows.

With reference again to FIG. 1, generally, system 100 can include an augmentation system 102 having an information gather component 104 and an interface component 106 therein. Together, these components (104, 106) enable monitor of reality, aggregation of information, as well as overlay of information to form the basis for an augmented reality rendition of information. Each of these components (104, 106) will be described in greater detail in accordance with the figures that follow.

The following scenario is provided to add perspective to the innovation and is not intended to limit the innovation in any manner. Rather, the example(s) provided are to be viewed as but one example of the system. Thus, the example is not intended to limit the scope of this specification and/or claims appended hereto.

Users encounter many situations where nuances of the environment they are in may require pause or some other adjustment to circumstance (e.g., augmentation). One such nuance is sometimes observed in the real world when tourists go on vacation. In these scenarios, oftentimes tourists will hire a tour guide to manually overlay the guide's experiences onto the unfamiliar tourist's experiences. In this manner the overall user experience can be enriched as 'augmented' by the more experienced guide.

The system 100 provides various techniques to dynamically overlay or intersperse virtual capabilities (and information) with real-world situations. In the tour guide example, a map can guide a user on a particular path and, based on preferences, the path may be mapped onto an existing visual image observed by the user. Thus, an 'augmented' map can be established that mixes real-world data with virtual-world data.

In still other aspects, items that might be augmented potentially include the ability to filter or ignore based on a given class. Once information is gathered (e.g., via the information gather component 104), this filtering functionality can be effected by way of the interface component 106. Rather than bringing additional resources as an augmentation, it is to be understood that filtering can work in reverse where distractions are minimized based on preferences or detected contexts.

In operation, a user may set a filter such that any data or information pushed from a particular store or context is ignored. Similarly, if a detected context has changed, data can be augmented in accordance with a particular device or medium to automatically enrich the given context. Here, contextual factors can be compiled or captured by way of the information gather component 104.

In determining contextual factors, bio-reactive components can be provided to sense state of a given user and augment their environment, such as sound or video presentations based on such detection. In yet other aspects, functions including, but not limited to, phone and game functions can also be scaled based on the environment or other detected conditions. In an educational situation, content and creation can be altered based on collective or detected individual needs such as by analyzing respective profiles.

Still further, self-improvement gaming options can be provided where a personal coach can be inserted into a game or other tool such as a training aid. Context sensitive features can be provided that are generated to overlay or promote a given situation. Other augmented features in a gaming scenario can include a 'spectator mode' such as overlaying a real-life arena onto a particular game or conversely logging into an area or venue and employing the dynamics of the arena for a game.

In a navigation example (e.g., global position system (GPS)), a map to a destination can be 'augmented' based upon user preferences. As well, the map can be augmented in real-time and personalized based upon contextual factors. For instance, time of day can be factored to, for example, overlay restaurants and sights of interest upon a destination map. Here, at lunchtime, restaurants (e.g., fast food) can be overlaid upon the destination map. Similarly, at breakfast or dinner time, a different set of restaurants can be overlaid. Still further, personal preferences, individuals in proximity, time available, route/destination, etc. can be considered in determining information by which to overlay.

Figure 2:
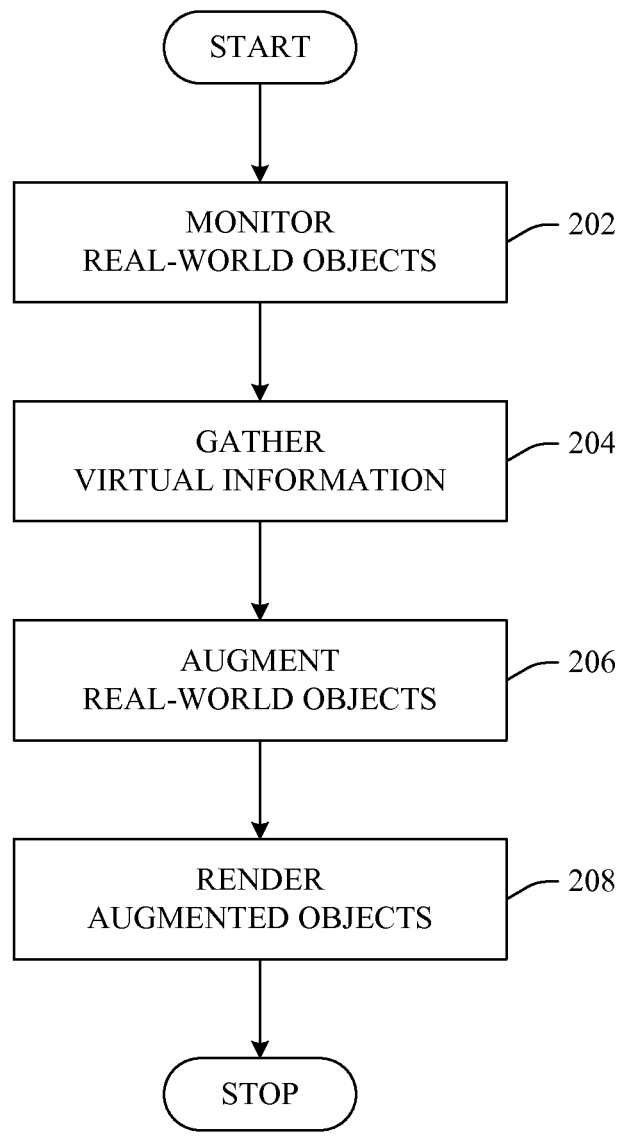
FIG. 2 illustrates an example flow chart of procedures that facilitate augmenting reality in accordance with an aspect of the innovation.

FIG. 2 illustrates an example methodology of augmenting reality in accordance with an aspect of the innovation. This example methodology illustrates a flow chart of procedures associated with augmenting reality with virtual information, for example, via the Internet. In operation, this methodology enables augmentation of real-world objects (e.g., actions, events, places) with other information. This augmentation can personalize, improve, describe, etc. the real-world occurrence thereby enhancing a user experience.

While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 202, real-world objects are monitored. Here, objects such as, visual objects, auditory objects, etc. can be monitored. It is to be understood and appreciated that contextual factors (e.g., location, date/time, engaged activity . . . ) can be employed in determining which objects to monitor. As well, these contextual factors can be employed to augment reality with virtual information. The objects can be analyzed, for example, by way of pattern or sound recognition. Thereafter, virtual information can be gathered at 204. Here, virtual information can be gathered which is related to the real-world objects.

While many of the examples described herein are directed to augmenting reality with virtual information, it is to be understood that other examples augment virtual renditions with reality aspects and factors. For example, a video game can be automatically augmented with location-based information (e.g., specific sports teams or stadiums) based upon a context (e.g., location) of a user. These and other examples of augmenting a virtual-world experience with real-world factors are to be included within the scope of the innovation and claims appended hereto.

Returning to the example of FIG. 2, in a specific example, real-world objects and context can be monitored at 202. For instance, as described in the aforementioned navigation example, the innovation can monitor location, time, visual objects, as well as other contextual factors. Accordingly, at 204, information can be gathered which relates to the real-world objects (and context).

At 206, the real-world objects and experience can be augmented with virtual information. In other words, the information can be consolidated into a single enhanced rendition of the real-world experience. Here, the information can be consolidated based upon a preference, policy, context, etc. Thereafter, at 208, the augmented experience can be rendered to a user. In operation, device context can be employed to effectively render the augmented experience.

Essentially, the innovation discloses examples of enhancing real-world experiences with virtual-world information (and vice-versa). By augmenting real-world (and/or virtual-world) experiences, the innovation enhances information exchange thereby increasing comprehensiveness as well as personalization of the rendition.

Figure 3:
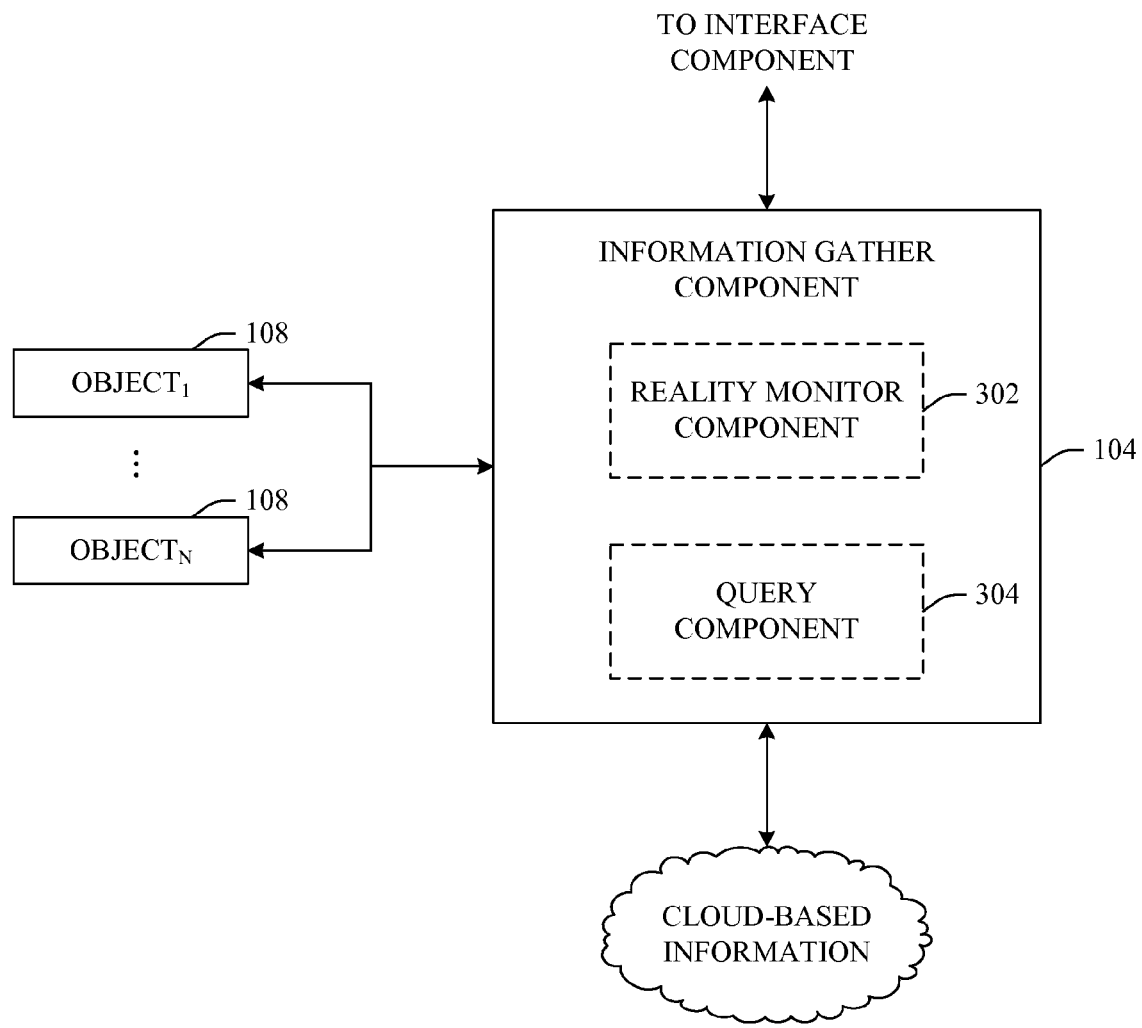
FIG. 3 illustrates an example information gather component in accordance with an aspect of the innovation.

Turning now to FIG. 3, a block diagram of an example information gather component 104 is shown in accordance with an aspect of the innovation. As shown, the information gather component 104 can include a reality monitor component 302 and a query component 304. Together, these subcomponents enable real-time monitoring and virtual information gathering in accordance with aspects of the innovation.

The reality monitor component 302 can employ sensory mechanisms (e.g., environmental sensors, physiological sensors) to track factors (e.g., objects) related to the physical real-world. For example, sensors can be used to monitor objects and contextual factors in the real (e.g., physical) world. As described above, logic and analysis mechanisms can be used to evaluate the real-world objects and contextual factors.

The query component 304 can be used to access, retrieve or otherwise obtain information related to the real-world objects and contextual factors. For instance, the query component 304 can be used to access information from the Internet, intranet, cloud-based, remote or local sources. This information can be used to augment, supplement or otherwise enhance a real-world environment.

It is to be understood, that, conversely, the innovation can also be used to augment virtual-scenarios in a similar manner. For instance, in a gaming scenario, the innovation can be used to personalize venues, names or other factors to enhance a user gaming experience. These alternative examples are to be included within the scope of the innovation and claims appended hereto.

Figure 4:
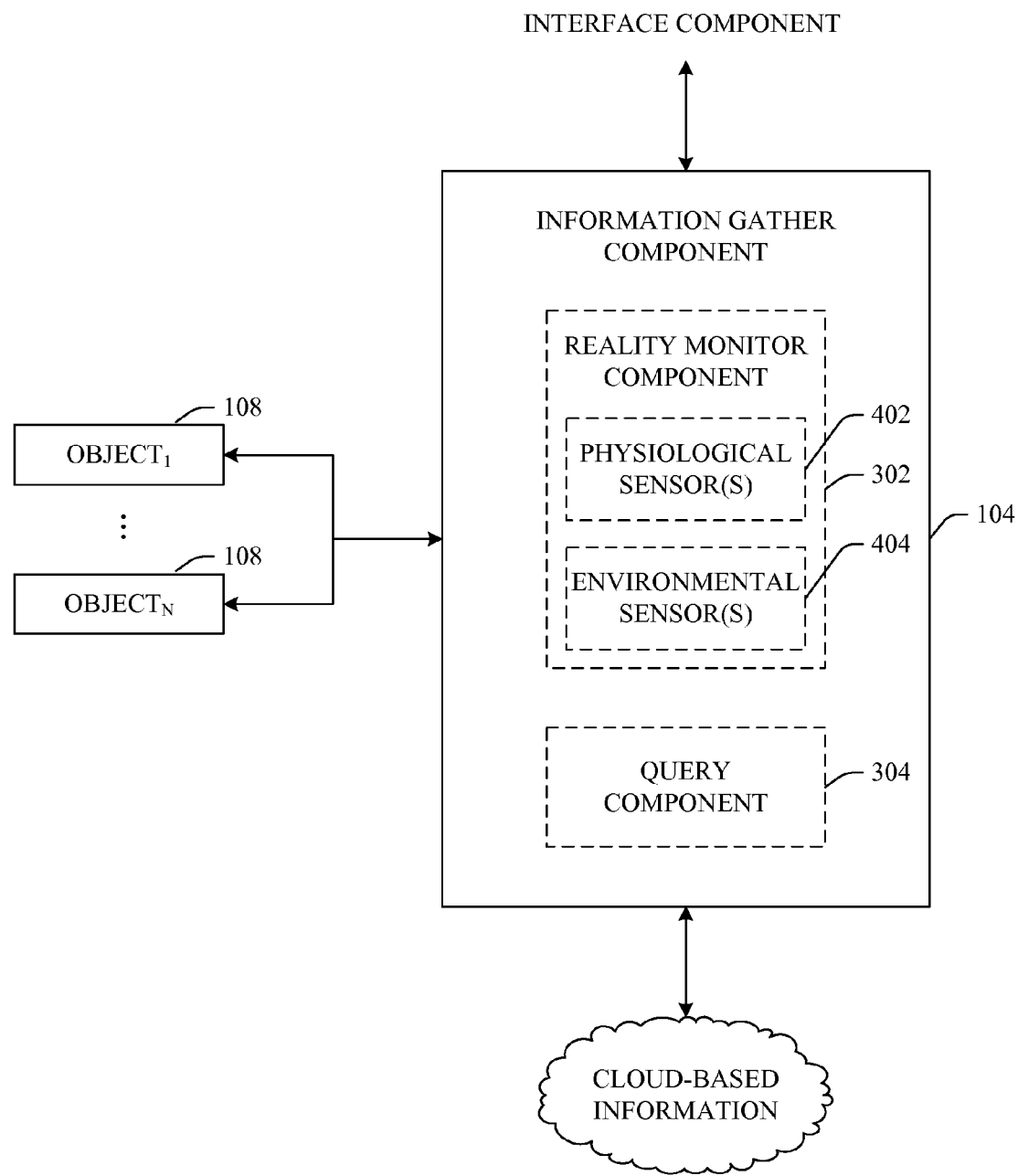
FIG. 4 illustrates an example information gather component that employs physiological as well as environmental sensors in accordance with an aspect of the innovation.

Referring now to FIG. 4, an alternative block diagram of an example information gather component 104 is shown. As illustrated, reality monitor component 302 can include physiological sensors 402 as well as environmental sensors 404. In operation, these components (402, 404) can be used to gather information related to reality including, audible, visual and other contextual factors.

By way of specific examples, environmental sensors 404 can include optics, microphones, location detection systems (e.g., global position systems (GPS)), clocks, calendars, weather indicators (e.g., thermometers), etc. Most any factor related to an environment can be captured by way of environmental sensors 404.

Similarly, most any factor related to a physiological criterion can be captured by way of physiological sensor(s) 402. More particularly, physiological sensor(s) 402 can be used to capture mood, engaged activity, heart rate, blood pressure, etc. In operation, these sensory mechanisms (402, 404) can be employed to capture factors related to real-world scenarios. Thus, an interface component (102 of FIG. 1) can be used to evaluate the captured data which can be used to query for virtual-world data. This virtual-world data can be used to augment reality as described above.

Figure 5:
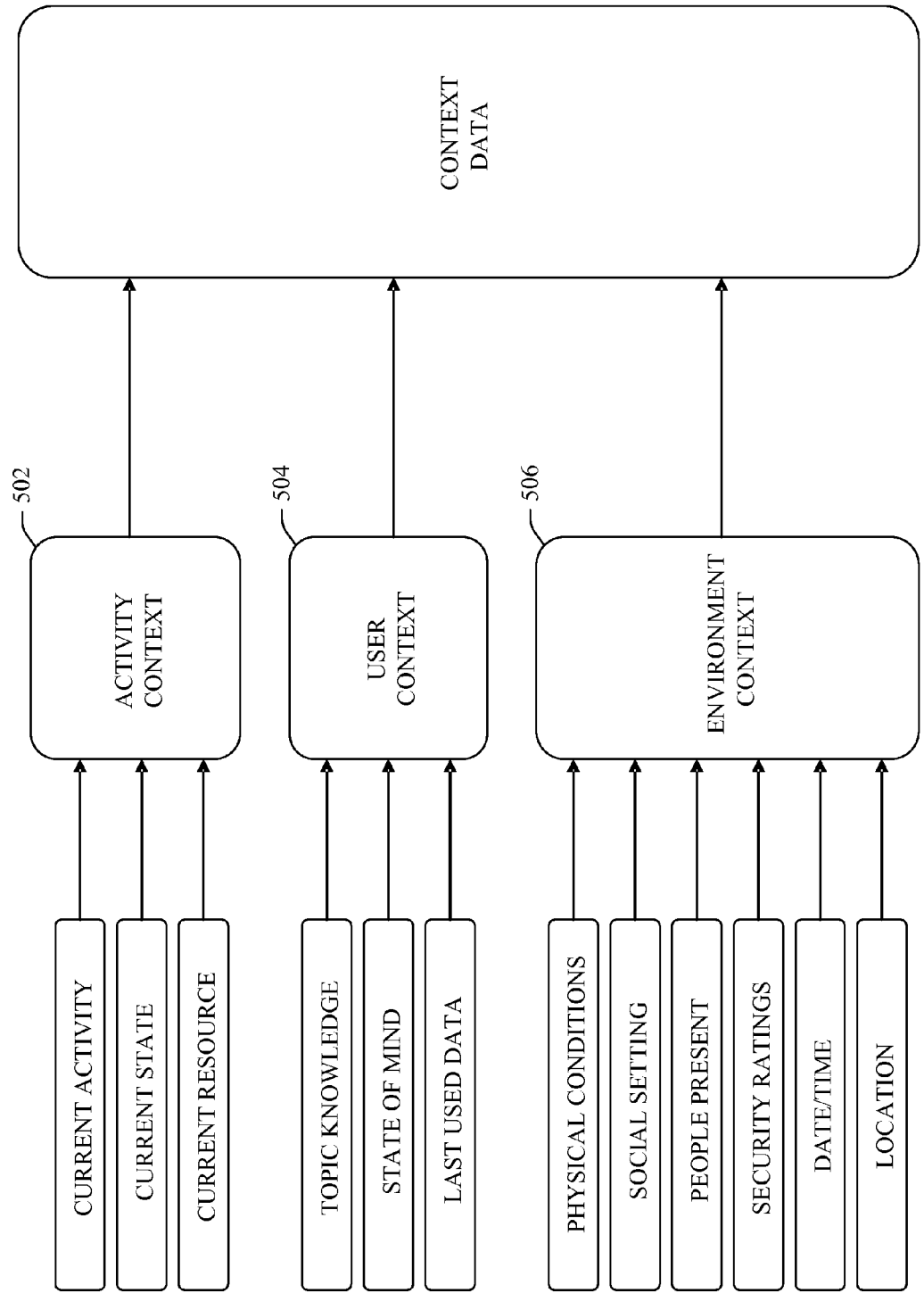
FIG. 5 illustrates example contextual data in accordance with aspects of the innovation.

FIG. 5 illustrates a sampling of the kinds of data that can comprise context data captured in accordance with the innovation. In accordance with the aspect illustrated in FIG. 5, the context data can be expressed in 3 classes: activity context 502, user context 504, and environment context 504.

By way of example, and not limitation, the activity context data 502 can include the current activity the user is performing. It is to be understood that this activity information can be explicitly determined and/or inferred (e.g., by way of machine learning and reasoning (MLR) mechanisms). Additionally, the activity context data 502 can include the current state (if any) within the activity. Moreover, the activity context data 502 can include a current resource (e.g., file, application, gadget, email, etc.) that the user is interacting with in accordance with the activity.

In an aspect, the user context data 504 can include topics of knowledge that the user knows about with respect to the activity and/or application. As well, the user context data 504 can include an estimate of the user's mood or state of mind (e.g., happy, frustrated, confused, angry, etc.). The user context 504 can also include information about when the user most recently used the current activity, step, resource, etc.

It will be understood and appreciated that the user's state of mind can be estimated using different input modalities, for example, the user can express intent and feelings, the system can analyze pressure and movement on a mouse, verbal statements, physiological signals, etc. to determine state of mind.

With continued reference to FIG. 5, the environment context data 506 can include the physical conditions of the environment (e.g., wind, lighting, ambient, sound, temperature, etc.), the social setting (e.g., user is in a business meeting, or user is having dinner with his family), the other people who are in the user's immediate vicinity, data about how secure the location/system/network are, the date and time, and the location of the user. As stated above, although specific data types are identified in FIG. 5, it is to be understood that additional types of data can be included within the context data. As well, it is to be understood that this additional data is to be included within the scope of the disclosure and claims appended hereto.

Figure 6:
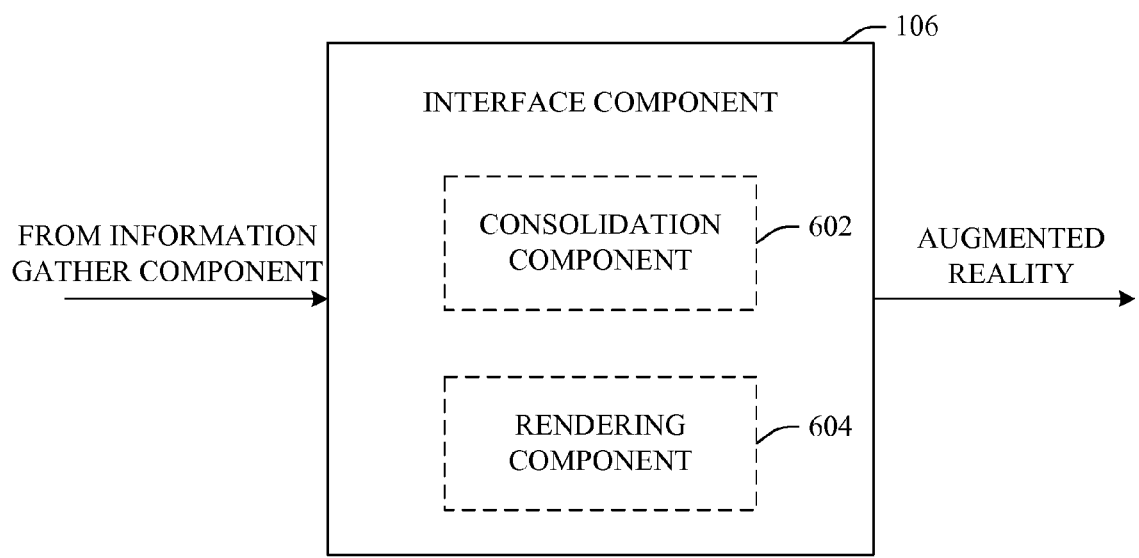
FIG. 6 illustrates an example interface component that facilitates augmentation of real-world data in accordance with an aspect of the innovation.

Turning now to FIG. 6, a block diagram of an example interface component 106 is shown. Generally, the example interface component 106 can include a consolidation component 602 and a rendering component 604 which, together, can combine and render real-world data overlaid with virtual-world data. Essentially, these two sub-components effect composition and rendition of the augmented reality of the innovation. While specific features of the innovation are highlighted in accordance with specific embodiments, it is to be understood that other features, functions and benefits are to be considered within the scope of the innovation as described.

In operation, the consolidation component 602 can analyze gathered data and thereafter effect consolidation of such information to provide augmentation of reality. Moreover, the consolidation component 602 enables aggregation of gathered data to further enable augmentation of reality by providing virtual-world data overlaid upon real-world data. Example block diagrams of each of these sub-components are shown in FIGS. 7 and 8 described below.

Figure 7:
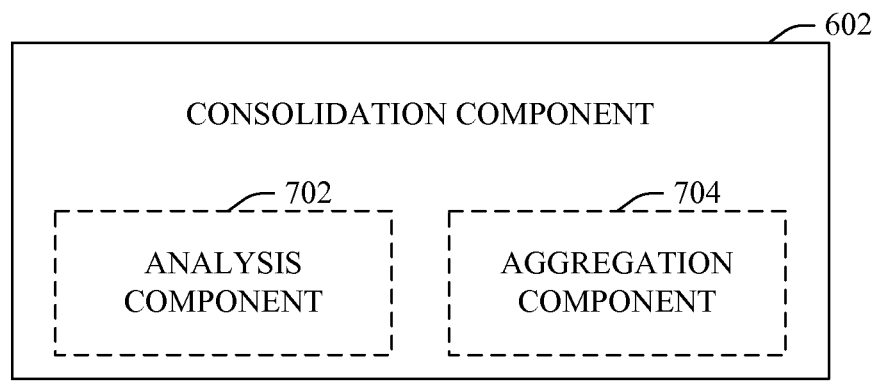
FIG. 7 illustrates an example consolidation component that analyzes and aggregates data in accordance with an aspect of the innovation.

With reference now to FIG. 7, an example consolidation component 602 can include an analysis component 702 and an aggregation component 704, which together enable generation of augmented data. In an example, the analysis component 702 can be used to evaluate gathered data whereby the aggregation component 704 facilitates collection and overlaying of the virtual data upon the real-world data.

Continuing with the tour guide example above, here, the analysis component 702 can evaluate information such as current location, time, weather, user preferences/policies, etc. Thereafter, the aggregation component 704 can employ the results of the analysis to overlay appropriate or otherwise pertinent virtual data upon the real world data (e.g., map). It will be appreciated that this process can be dynamic and therefore formulated on-the-fly. Thus, a user can constantly be provided with comprehensive and enhanced information as needed or desired.

Figure 8:
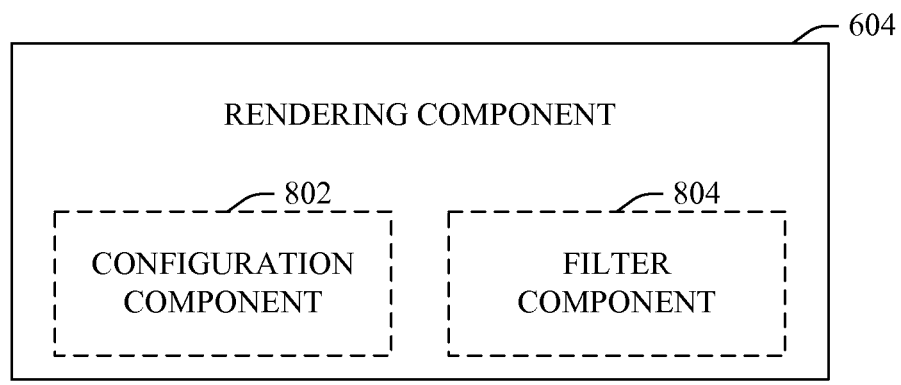
FIG. 8 illustrates an example rendering component that configures and filters data in accordance with an aspect of the innovation.

FIG. 8 illustrates a block diagram of an example rendering component 604 in accordance with an aspect of the innovation. As shown, the rendering component 604 can include a configuration component 802 and a filter component 804 which can enable establishing a personalized augmented reality rendition as desired. While distinct sub-components (802, 804) are illustrated in FIG. 8, it is to be understood and appreciated that all or a portion of the functionality described herein can be incorporated into a single component or embodied within one of the other sub-components as appropriate. These alternative aspects are to be included within the scope of the innovation and claims appended hereto.

The configuration component 802 can be employed to arrange or otherwise format the augmented rendition for delivery to a user (or application). For instance, the configuration component 802 can employ device type or context to automatically configure the rendition into a suitable format for a particular device in a particular context. By way of specific example, the configuration component 802 can configure a rendition differently if the target device is a smartphone versus a laptop computer. Here, in addition to the smaller display size, the smartphone will most likely have less processing power as well as internal memory available than the laptop computer. Thus, information can be consolidated, downsized, compressed or filtered as appropriate.

The filter component 804 can assist the configuration component 802 in preparing a rendition for a particular target device. As well, the filter component 804 can be employed to filter components and objects based upon policy, preference and/or contextual factors. For instance, in the navigation example, if restaurants are to be displayed (or overlaid) upon a real-world map—here, the system can consider user preferences as well as context (e.g., time of day) so as to limit the amount of information displayed. It will be appreciated that the filter component 804 can be employed to filter objects or information based upon most any factor or parameter available. Many of the features, functions and/or benefits of the innovation can be implemented together with machine learning and reasoning (MLR). These MLR mechanisms can make decisions or inferences on behalf of a user by being trained and learning over time by observing patterns, actions, etc.

Figure 9:
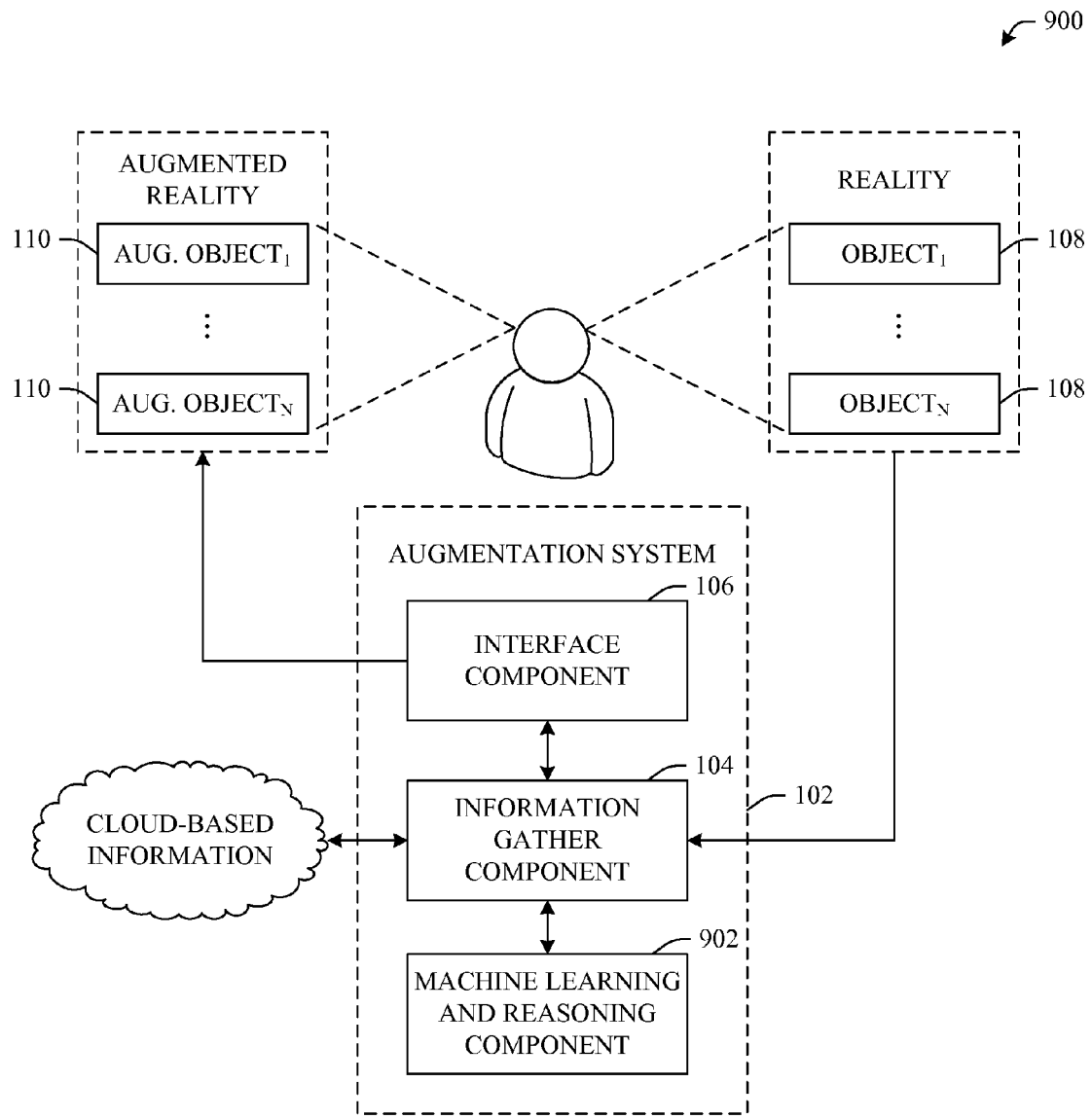
FIG. 9 illustrates an architecture including machine learning and reasoning-based component that can automate functionality in accordance with an aspect of the innovation.

FIG. 9 illustrates a system 900 that employs an MLR component 902 which facilitates automating one or more features in accordance with the subject innovation. The subject innovation (e.g., augmenting, monitoring, filtering, configuring . . . ) can employ various MLR-based schemes for carrying out various aspects thereof. For example, a process for determining when to augment real-world data can be facilitated via an automatic classifier system and process.

A classifier is a function that maps an input attribute vector, $x=(x1, x2, x3, x4, xn)$, to a confidence that the input belongs to a class, that is, $f(x)=\text{confidence(class)}$. Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria when to augment, how to augment, what to include within the augmentation, how to render the augmentation, etc.

Figure 10:
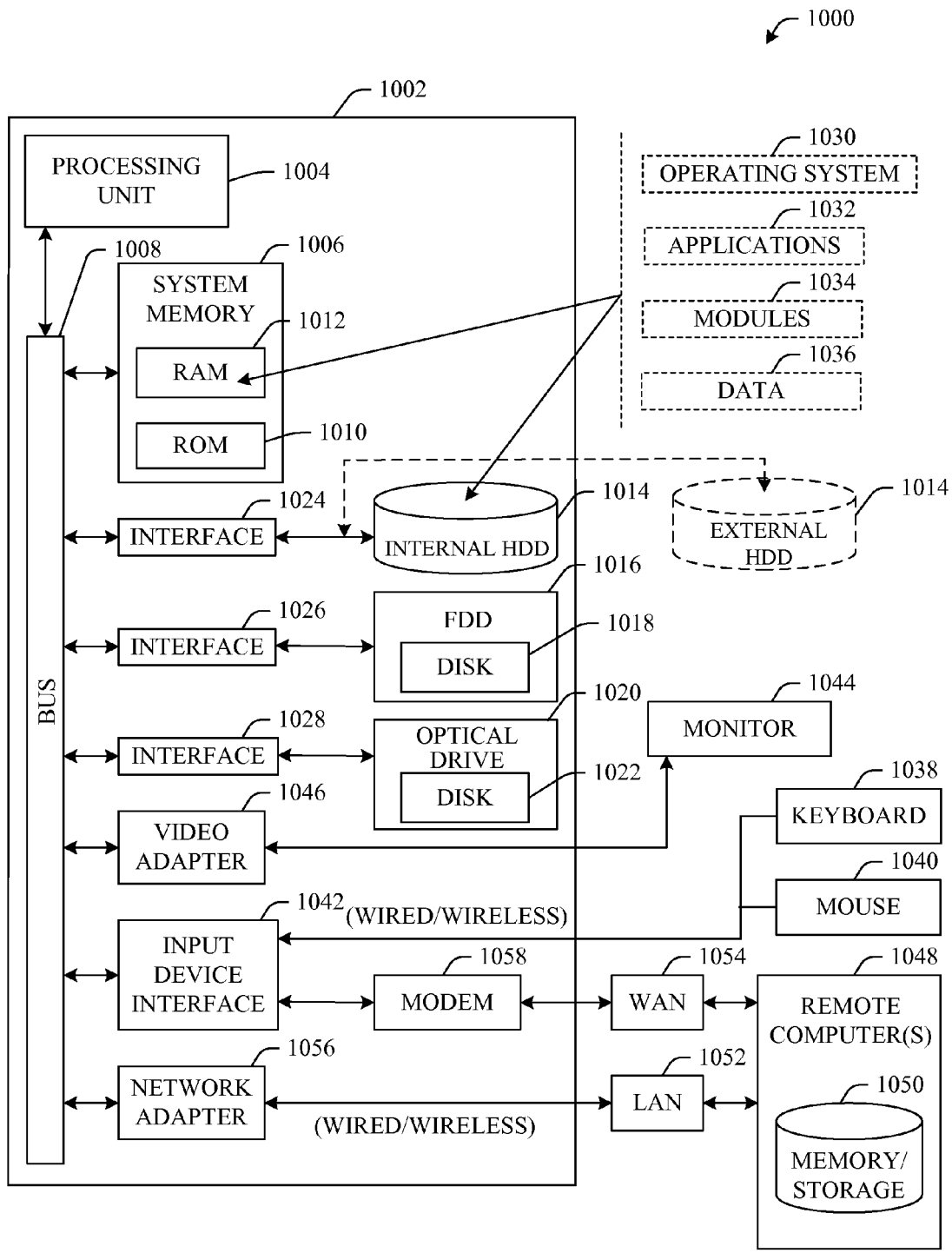
FIG. 10 illustrates a block diagram of a computer operable to execute the disclosed architecture.

Referring now to FIG. 10, there is illustrated a block diagram of a computer operable to execute the disclosed architecture. In order to provide additional context for various aspects of the subject innovation, FIG. 10 and the following discussion are intended to provide a brief, general description of a suitable computing environment 1000 in which the various aspects of the innovation can be implemented. While the innovation has been described above in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 10, the exemplary environment 1000 for implementing various aspects of the innovation includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the innovation can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 11:
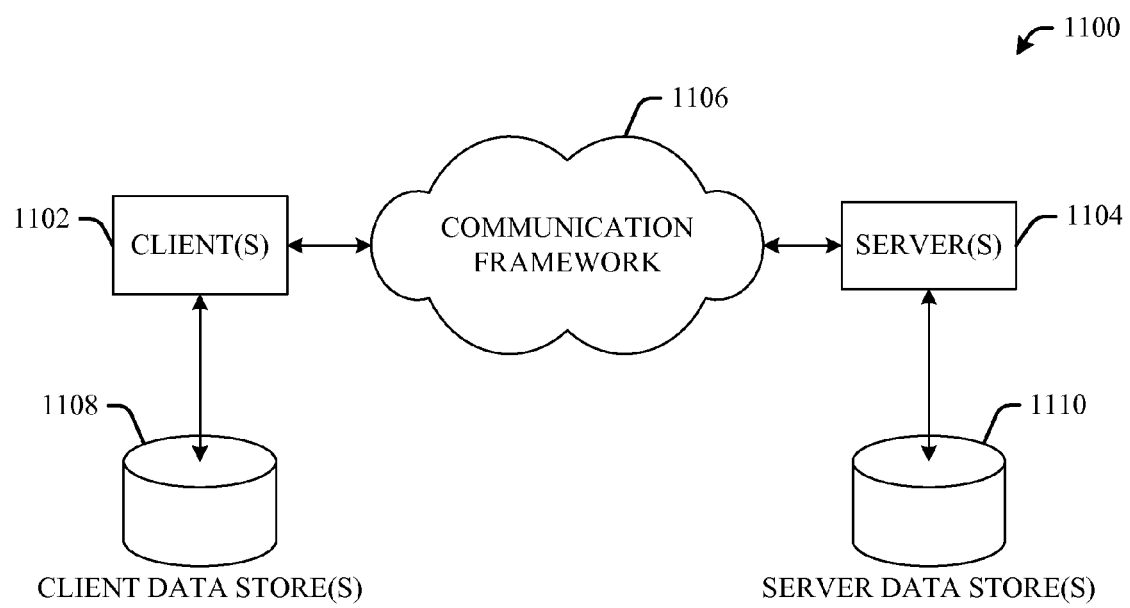
FIG. 11 illustrates a schematic block diagram of an example computing environment in accordance with the subject innovation.

Referring now to FIG. 11, there is illustrated a schematic block diagram of an exemplary computing environment 1100 in accordance with the subject innovation. The system 1100 includes one or more client(s) 1102. The client(s) 1102 can be hardware and/or software (e.g., threads, processes, computing devices). The client(s) 1102 can house cookie(s) and/or associated contextual information by employing the innovation, for example.

The system 1100 also includes one or more server(s) 1104. The server(s) 1104 can also be hardware and/or software (e.g., threads, processes, computing devices). The servers 1104 can house threads to perform transformations by employing the innovation, for example. One possible communication between a client 1102 and a server 1104 can be in the form of a data packet adapted to be transmitted between two or more computer processes. The data packet may include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates augmenting reality, comprising:
   at least one processor;
   at least one computer-readable storage media storing instructions which, when executed by the at least one processor, implement:
   an information gathering component having a reality monitor component that gathers real-world data of at least one real-world object and a query component that obtains, via a communications network, virtual-world data based at least in part on a query related to the at least one real-world object; and
   an interface component configured to receive at least a portion of the gathered real-world data and at least a portion of the virtual-world data, the interface component having a consolidation component that aggregates the gathered real-world data and the virtual-world data into aggregated data, the interface component establishes an augmented-reality experience in which at least a portion of the gathered real-world data is overlaid with at least a portion of the virtual-world data.

2. The system of claim 1, wherein the query component is configured to establish the query based at least in part on contextual factors including activity context, user context, environment context, temporal context and geo-location context.

3. The system of claim 2, wherein the aggregated data includes contextual data related to temporal context, the temporal context including at least one of a time of day and a day of week.

4. The system of claim 2, wherein the aggregated data includes contextual data related to geo-location context, the geo-location context including at least one of the at least one real-world object and a user.

5. The system of claim 2, wherein the information gathering component is configured to determine whether to monitor at least one real-world object of a plurality of real-world objects based at least in part on the contextual factors.

6. The system of claim 5, wherein the aggregated data includes contextual data related to a subset of the plurality of real-world objects.

7. The system of claim 1, wherein the reality monitor component employs a sensor component to gather context-related information.

8. The system of claim 7, wherein the sensor component is at least one of an environmental or physiological sensor.

9. The system of claim 1, wherein the consolidation component includes:
an analysis component that analyzes the gathered real-world data and the virtual-world data; and
an aggregation component that combines the gathered real-world data with a subset of the virtual-world data based at least in part on contextual data.

10. The system of claim 1, further comprising a rendering component that personalizes the augmented-reality experience based at least in part on one of user preference, user policy, or context.

11. The system of claim 10, further comprising a configuration component that organizes the augmented-reality experience based at least in part on at least one of user preference, user policy, or user context.

12. The system of claim 10, further comprising a filter component that filters virtual data for inclusion within the augmented-reality experience based at least in part on at least one of user preference, user policy, or user context.

13. The system of claim 1, further comprising a machine learning and reasoning component that employs at least one of a probabilistic and a statistical-based analysis that infers an action that a user desires to be automatically performed.

14. A computer-implemented method of augmenting reality, comprising:
monitoring a plurality of real-world objects;
gathering real-world data related to the monitored plurality of real-world objects;
establishing a query related to at least one of the plurality of real-world objects;
obtaining, via a communications network, virtual-world information related to at least one of the plurality of real-world objects in response to the query;
aggregating the gathered real-world data and the virtual-world information into aggregated data; and
establishing an augmented-reality experience in which at least a portion of the gathered real-world data is overlaid with at least a portion of the virtual-world information based at least in part on the aggregated data.

15. The method of claim 14, wherein the establishing an augmented-reality experience in which at least a portion of the gathered real-world data is overlaid with at least a portion of the virtual-world information based at least in part on the aggregated data includes rendering at least a portion of the aggregated data to a user based at least in part on one of a context, policy or preference.

16. The method of claim 15, wherein the context is at least one of activity context, user context or environment context.

17. The method of claim 14, further comprising:
filtering an augmented-reality based at least in part on a context; and
wherein the establishing an augmented-reality experience includes rendering the filtered augmented-reality.

18. A computer-executable system comprising:
means for machine learning and reasoning to infer an action that a user desires to be automatically performed;
means for monitoring a plurality of real-world objects related to a user;
means for establishing a query related to at least one of the plurality of real-world objects;
means for obtaining, via a communications network, virtual-world information related to at least one of the plurality of real-world objects in response to the query related to at least one of the plurality of real-world objects;
means for aggregating at least a portion of the gathered real-world data and with at least a portion of the virtual-world information into aggregated data; and
means for rendering the aggregation to a user in accordance with the inferred action, wherein at least a portion of the real-world data is overlaid with at least a portion of the virtual-world data.

19. The computer-executable system of claim 18, further comprising means for filtering the virtual-world information based at least in part on a user preference.

20. The computer-executable system of claim 18, wherein the means for obtaining virtual-world information related to at least one of the plurality of real-world objects in response to the query related to at least one of the plurality of real-world objects obtains the virtual-world information, from a remote source, over an internet connection.

* * * * *